United States Patent
Nagakubo et al.

(10) Patent No.: US 12,267,753 B2
(45) Date of Patent: Apr. 1, 2025

(54) INFORMATION PROCESSING DEVICE, INFORMATION PROCESSING METHOD, COMPUTER PROGRAM PRODUCT, AND INFORMATION PROCESSING SYSTEM

(71) Applicant: KABUSHIKI KAISHA TOSHIBA, Tokyo (JP)

(72) Inventors: Sakie Nagakubo, Kawasaki Kanagawa (JP); Hiroki Kudo, Kawasaki Kanagawa (JP); Yasuyuki Tanaka, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 310 days.

(21) Appl. No.: 17/823,165

(22) Filed: Aug. 30, 2022

(65) Prior Publication Data

US 2023/0239666 A1 Jul. 27, 2023

(51) Int. Cl.
*H04W 4/38* (2018.01)
*G06F 11/30* (2006.01)
*H04W 84/18* (2009.01)

(52) U.S. Cl.
CPC ........... *H04W 4/38* (2018.02); *G06F 11/3089* (2013.01); *H04W 84/18* (2013.01)

(58) Field of Classification Search
None
See application file for complete search history.

(56) References Cited

U.S. PATENT DOCUMENTS

2016/0066319 A1 3/2016 Sakata et al.
2016/0259032 A1* 9/2016 Hehn ................. G01S 1/024
(Continued)

FOREIGN PATENT DOCUMENTS

JP 2012-98901 A 5/2012
JP 2016-54349 A 4/2016
(Continued)

OTHER PUBLICATIONS

Japan Patent Office, Office Action in JP App. No. 2022-007611, 2 pages, with machine translation, 4 pages (Aug. 27, 2024).
(Continued)

*Primary Examiner* — Xavier S Wong
(74) *Attorney, Agent, or Firm* — Finnegan, Henderson, Farabow, Garrett & Dunner, LLP

(57) ABSTRACT

An information processing device according to one embodiment includes a hardware processor. The hardware processor functions to receive, from each of communication devices, communication data including sensor data and time information. The sensor data indicates a result of measurement by a sensor of each communication device. The time information indicates a measurement time of the sensor data. The hardware processor functions to specify, as event communication data, the communication data including event sensor data being the sensor data of an event simultaneously occurring in the network. The hardware processor functions to calculate a time delay amount among the communication devices on the basis of the event sensor data and the time information, each being included in the event communication data of each communication device. The hardware processor functions to correct the time information included in the communication data on the basis of the delay amount.

6 Claims, 10 Drawing Sheets

(56) References Cited

U.S. PATENT DOCUMENTS

| | | | | |
|---|---|---|---|---|
| 2017/0237484 A1* | 8/2017 | Heath | ............ | H04B 10/07953 |
| | | | | 398/26 |
| 2018/0160939 A1* | 6/2018 | Chapman | .......... | A61M 16/0003 |
| 2020/0396772 A1* | 12/2020 | Tirronen | ................ | H04W 4/38 |
| 2022/0070801 A1 | 3/2022 | Satoh | | |
| 2022/0159650 A1* | 5/2022 | Li | .......................... | H04W 4/06 |

FOREIGN PATENT DOCUMENTS

| | | |
|---|---|---|
| JP | 2016-80621 A | 5/2016 |
| JP | 2021-131818 A | 9/2021 |
| WO | WO 2020/149103 A1 | 7/2020 |

OTHER PUBLICATIONS

International Search Report for corresponding application No. PCT/JP2019/050088, date of mailing Feb. 10, 2020. (6 pgs.).

\* cited by examiner

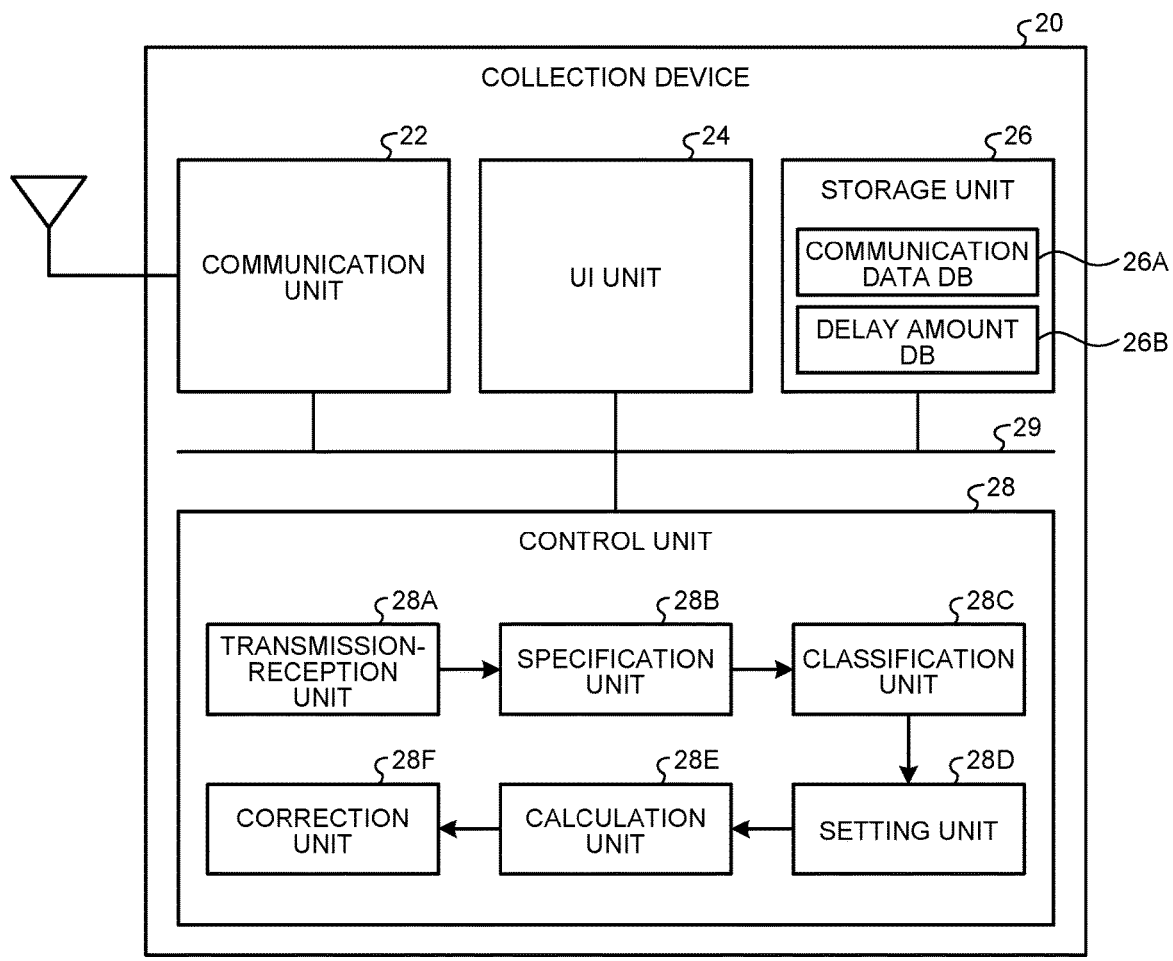

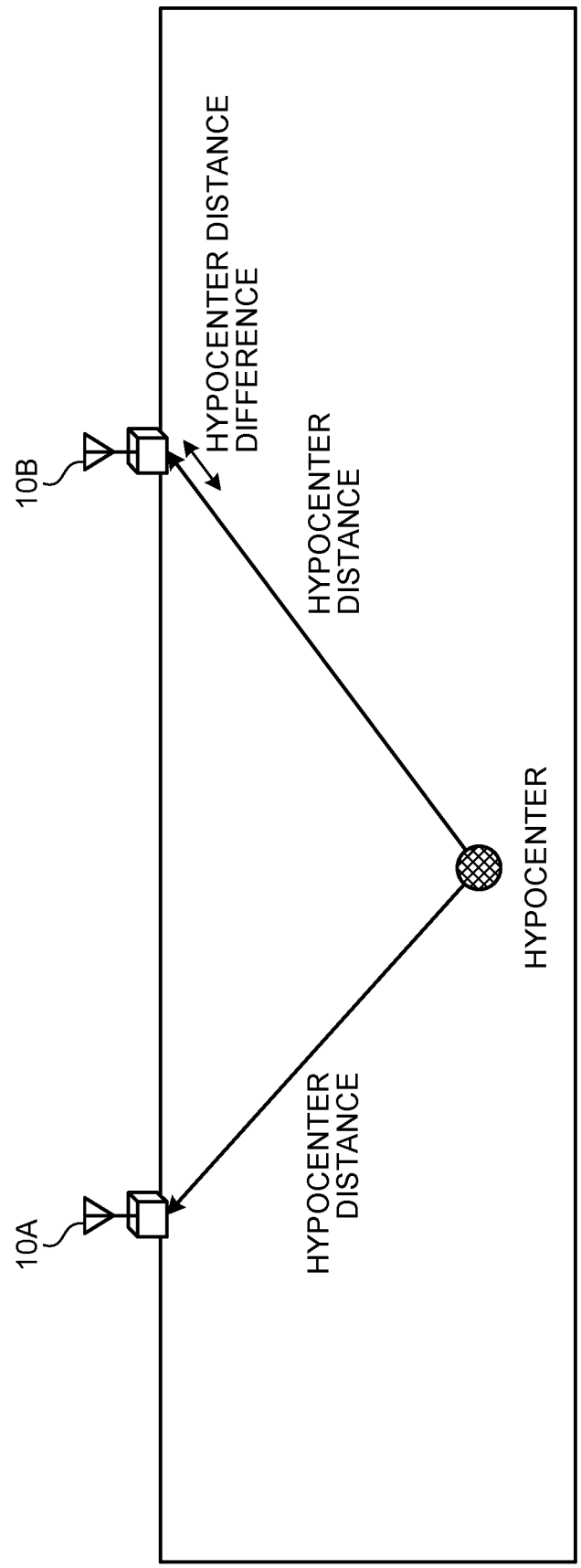

INFORMATION PROCESSING DEVICE, INFORMATION PROCESSING METHOD, COMPUTER PROGRAM PRODUCT, AND INFORMATION PROCESSING SYSTEM

CROSS-REFERENCE TO RELATED APPLICATIONS

This application is based upon and claims the benefit of priority from Japanese Patent Application No. 2022-007611, filed on Jan. 21, 2022; the entire contents of which are incorporated herein by reference.

FIELD

Embodiments described herein relate generally to an information processing device, an information processing method, a computer program product, and an information processing system.

BACKGROUND

A conventionally known system collects sensor data of a sensor mounted on each of communication devices connected to a network. However, difference occurs in time information of the sensor data in some cases due to individual difference among the communication devices, transmission delay, communication frequency, and synchronization error in accordance with the number of relays, and the like.

Considering the above, in a known system of the conventional technologies, a global positioning system (GPS) is mounted on each of communication devices. However, the configuration in which a GPS is mounted on each of communication devices potentially leads to device-size increase and complication. In another disclosed configuration of the conventional technologies, an error from the reception time of a sensing start signal received from a collection device is calculated, and time information corrected in accordance with the error is transmitted from communication devices to the collection device. However, in such a conventional technology, transmission delay between the collection device and the communication devices is not considered, and the difference in time information is not solved in some cases. Thus, with the conventional technologies, it has been difficult to easily reduce the difference in time information between communication devices connected to a network.

BRIEF DESCRIPTION OF THE DRAWINGS

FIG. 3 is a diagram of a functional configuration of a collection device;

FIG. 4 is a schematic diagram of a data configuration of communication data;

FIG. 5C is an explanatory diagram of classification into groups;

DETAILED DESCRIPTION

An information processing device according to one embodiment includes one or more hardware processors. The one or more hardware processors are configured to function as a transmission-reception unit, a specification unit, a calculation unit, and a correction unit. The transmission-reception unit serves to receive, from each of communication devices connected to a network, communication data including sensor data and time information. The sensor data indicates a result of measurement by a sensor mounted on each of the communication devices. The time information indicates a measurement time of the sensor data. The specification unit serves to specify, as event communication data. The communication data includes event sensor data being the sensor data of an event simultaneously occurring in the network. The calculation unit serves to calculate a time delay amount among the communication devices on the basis of the event sensor data and the time information, each being included in the event communication data of each communication device. The correction unit serves to correct the time information of the sensor data included in the communication data on the basis of the delay amount.

The following describes an information processing device, an information processing method, an information processing program, and an information processing system in detail with the accompanying drawings.

Figure 1:
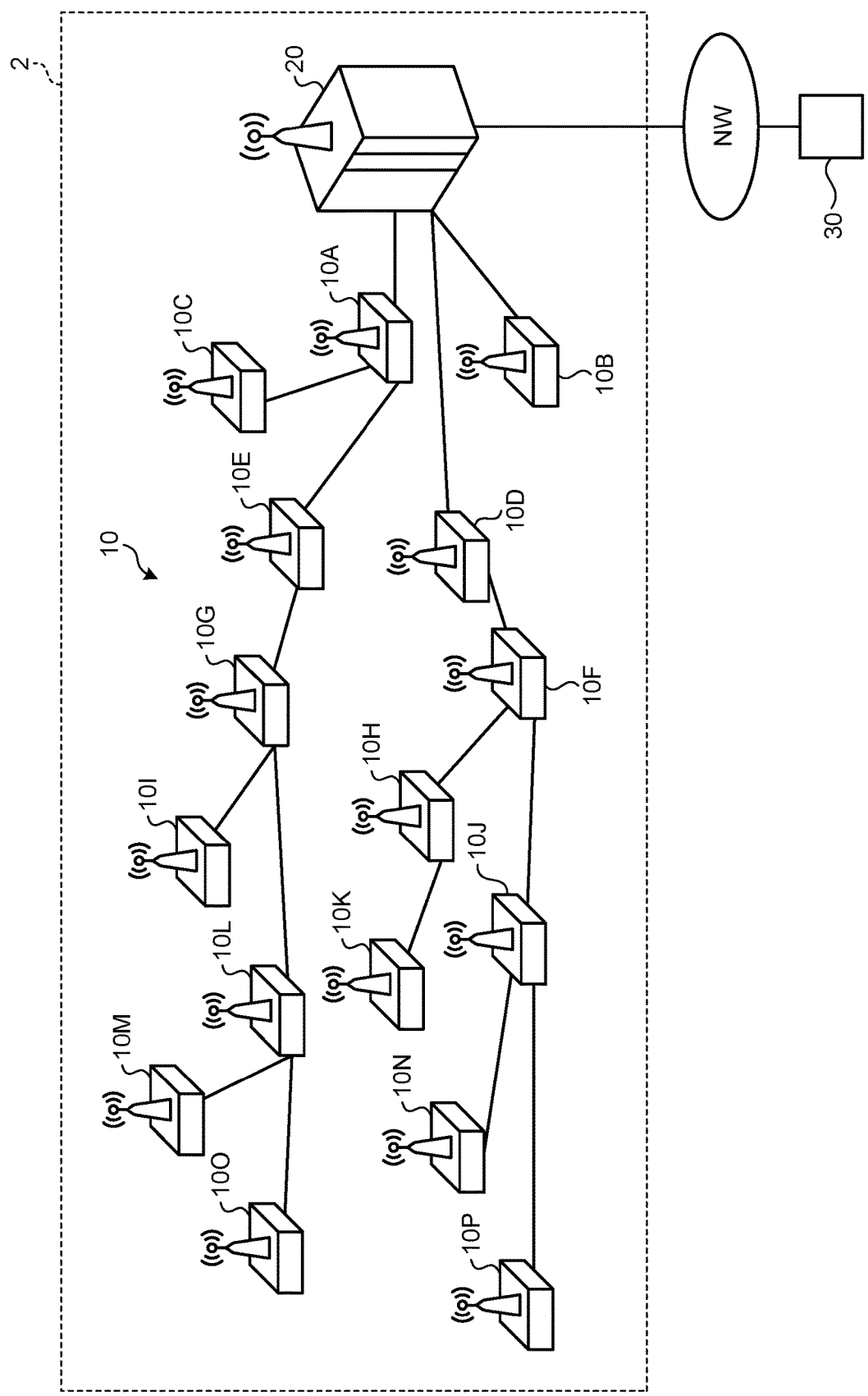
FIG. 1 is a schematic diagram of an information processing system.

FIG. 1 is a schematic diagram illustrating an exemplary information processing system 1 according to the present embodiment.

The information processing system 1 includes a communication system 2 and a server device 30.

The communication system 2 includes a plurality of communication devices 10 and a collection device 20. The collection device 20 is an exemplary information processing device of the present invention. Each of the communication devices 10 and the collection device 20 are connected to each other to perform communication between them.

FIG. 1 illustrates communication devices 10A to 10P as exemplary communication devices 10. The communication system 2 is not limited to the configuration including sixteen communication devices 10 of the communication devices 10A to 10P, as long as including a plurality of communication devices 10. In the following description, when not distinguished from one another, the communication devices 10A to 10P simply referred to as communication devices 10.

Each of the communication devices 10 and the collection device 20 only need to be connected to each other to perform communication between them, and the network topology and the communication scheme of the communication system 2 are not limited. For example, the network topology of the communication system 2 may be any of a star type, a tree type, a ring type, a mesh type, and the like. The communication scheme of the communication system 2 is optional and not limited. For example, the communication scheme of the communication system 2 is a time division multiplex scheme but is not limited thereto.

The present embodiment will be described with an example in which the communication system 2 has the network topology of the tree type with the collection device 20 at a root node and has a multi-hop network in which the communication devices 10 are wirelessly connected to the collection device 20 in a tree structure.

Figure 2:
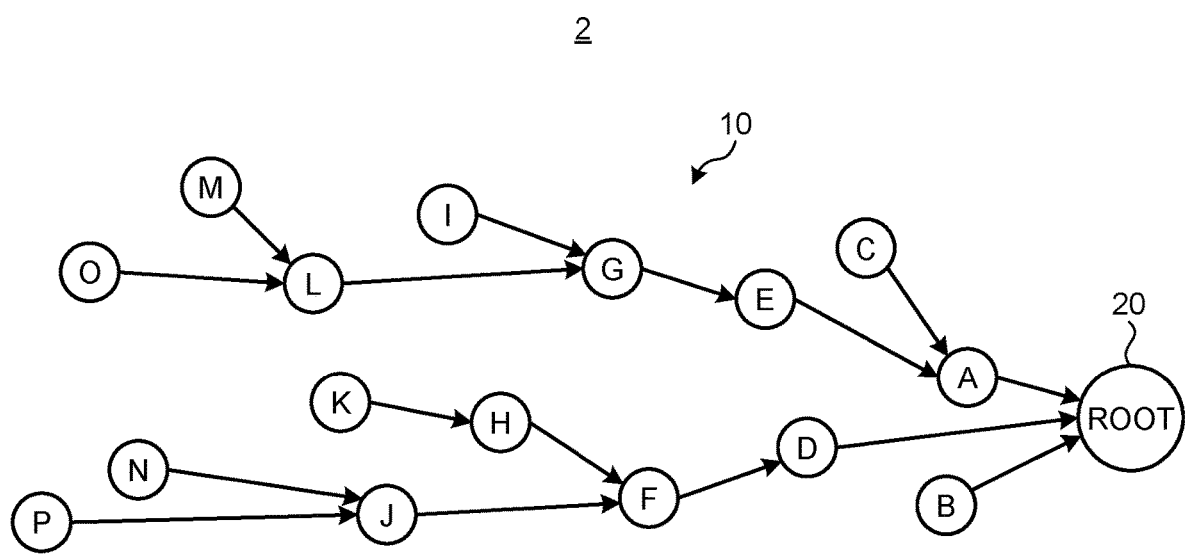
FIG. 2 is a schematic diagram of a communication system.

FIG. 2 is a schematic diagram illustrating the communication system 2 in the form of the network topology. In FIG. 2, each alphabet represents a communication device 10, and a root represents the collection device 20 as the root node. Each arrow represents a data transmission path. The rear end of an arrow indicates a child node at a data transmission source, and the point of an arrow indicates a parent node at a data transmission destination. The parent node is a node having a hop count smaller than that of a node of interest by one and is the transmission destination node of the node of interest. The child node is a node having a hop count larger than that of a node of interest by one. Although FIG. 2 illustrates topology that nodes are relayed, the communication system 2 may have topology that communication with a parent node is directly performed.

Description continues with reference to FIG. 1 again.

The server device 30 is connected to the collection device 20 through a network NW to perform communication between them. FIG. 1 exemplarily illustrates a form in which the information processing system 1 includes the server device 30. However, the information processing system 1 only needs to have a configuration including at least the communication system 2 and may have a configuration including no server device 30.

In the present embodiment, a sensor is mounted on each of the communication devices 10. Each sensor is a device configured to measure an environmental property of the communication device 10 on which the sensor is mounted. The sensor may be any instrument capable of measuring various kinds of environmental properties such as vibration, temperature, humidity, wind direction, air volume, illuminance, luminance, current consumption, voltage consumption, water amount, acceleration, tilt, and sound and is not limited to a particular measurement target.

Each of the communication devices 10 transmits, to the collection device 20, communication data including sensor data and time information, the sensor data being a result of environmental property measurement by the sensor mounted on each of the communication devices 10, and the time information being the measurement time of the sensor data. Each of the communication devices 10 may transmit communication data to the collection device 20 in each predetermined time or may transmit communication data to the collection device 20 when a predetermined condition is satisfied. The predetermined condition is, for example, a case in which a measurement target environmental property indicates a particular environmental property such as vibration equal to or larger than a threshold value, or a case in which the measurement target environmental property indicates an environmental property change equal to or larger than a threshold value, but is not limited thereto. The present embodiment will be described with an example in which each of the communication devices 10 transmits communication data toward the collection device 20 by multi-hop communication in each predetermined time.

FIG. 3 is a diagram illustrating an exemplary functional configuration of the collection device 20.

The collection device 20 includes a communication unit 22, a user interface (UI) unit 24, a storage unit 26, and a control unit 28. The communication unit 22, the UI unit 24, the storage unit 26 and the control unit 28 are connected to each other through a bus 29 or the like to perform communication between them.

The communication unit 22 performs data transmission and reception with the communication devices 10. In the present embodiment, the communication unit 22 performs wireless communication with the communication devices 10. The communication unit 22 also performs data transmission and reception with the server device 30 through the network NW.

The UI unit 24 includes a display function and an input function. The display function displays various kinds of information. The display function is, for example, a display or a projection device. The input function receives an operation input by a user. The input function is, for example, a pointing device such as a mouse or a touch pad, or a keyboard. The display function and the input function may be integrated as a touch panel. The collection device 20 may have a configuration including no UI unit 24.

The storage unit 26 stores various kinds of information. In the present embodiment, the storage unit 26 stores a communication data database (DB) 26A and a delay amount DB 26B. Details of the communication data DB 26A and the delay amount DB 26B will be described later.

The UI unit 24 and the storage unit 26 only need to be connected to the control unit 28 in a wired or wireless manner to perform communication between them. At least one of the UI unit 24 and the storage unit 26 may be connected to the control unit 28 through the network NW or the like. At least one of the UI unit 24 and the storage unit 26 may be provided outside the collection device 20. At least one of the UI unit 24, the storage unit 26, and one or more functional components included in the control unit 28, which will be described later, may be mounted on an external information processing device connected to the collection device 20 through the network NW or the like to perform communication between them. For example, at least one of the functional components included in the control unit 28, which will be described later may be mounted on the server device 30.

The control unit 28 executes information processing in the collection device 20. The control unit 28 includes a transmission-reception unit 28A, a specification unit 28B, a classification unit 28C, a setting unit 28D, a calculation unit 28E, and a correction unit 28F.

The transmission-reception unit 28A, the specification unit 28B, the classification unit 28C, the setting unit 28D, the calculation unit 28E, and the correction unit 28F are implemented by, for example, one or more processors. For example, each above-described component may be implemented as execution of a computer program by a processor such as a central processing unit (CPU), in other words, as software. Each above-described component may be implemented as a processor such as a dedicated IC, in other words, as hardware. Each above-described component may be implemented as software and hardware. When more than one processors are used, each processor may implement one of the components or may implement two or more of the components.

The transmission-reception unit 28A performs data transmission and reception with the communication devices 10 and the server device 30 through the communication unit 22. Specifically, the transmission-reception unit 28A receives communication data from each of the communication devices 10.

As described above, communication data includes sensor data and time information, the sensor data being a result of measurement by a sensor mounted on a communication device 10, and the time information being the measurement time of the sensor data. Upon each reception of communication data from each of the communication devices 10, the transmission-reception unit 28A registers the received communication data to the communication data DB 26A of the storage unit 26. The communication data registration to the communication data DB 26A may be performed after time information correction by the correction unit 28F to be described later.

FIG. 4 is a schematic diagram illustrating an exemplary data configuration of the communication data DB 26A. The communication data DB 26A is a database in which a node ID, installation environment information, a communication data ID, and communication data are associated. The data format of the communication data DB 26A is not limited to a database. The communication data DB 26A only needs to be a database in which at least communication data is registered, and the data configuration thereof is not limited to the form illustrated in FIG. 4.

The node ID is identification information of a communication device 10 at the transmission source of the communication data. In other words, the node ID is identification information of the communication device 10 on which a sensor having measured sensor data included in the corresponding communication data is mounted.

The installation environment information is information indicating the installation environment of the communication device 10 identified by the corresponding node ID. The installation environment information only needs to be information related to the environment of the communication devices 10, which could affect the difference in the time information of sensor data between the communication devices 10.

Specifically, the installation environment information is information including at least one of, for example, installation place information of the communication device 10, absolute position information of the communication device 10, network environment information of the communication device 10, and relative position information of the communication device 10 with respect to an event causing source.

The installation place information of a communication device 10 is information indicating the state of the installation place of the communication device 10. The information indicating the state of the installation place is information indicating, for example, the likelihood of environment variation at the installation place of the communication device 10. Specifically, for example, when the communication device 10 is installed in a structure such as a building, the installation place information is expressed as information such as the installation floor of the communication device 10. The installation place information may be information indicating, for example, the kind of a ground as the installation surface of the communication device 10. The kind of the ground is, for example, soil or concrete but not limited thereto.

The absolute position information of a communication device 10 is position information of the communication device 10, which is expressed by world coordinates such as latitude, longitude, and altitude. The network environment information of a communication device 10 is information indicating the network environment of the communication device 10 in the communication system 2. For example, the network environment information of a communication device 10 is expressed as the hop count of the communication device 10, or a group having the same direct or indirect parent node in network bifurcation of the tree type.

The installation place information, the absolute position information, and the network environment information may be registered in the communication data DB 26A in advance by, for example, an operation instruction on the UI unit 24 by an administrator or the like.

The relative position information is information related to the relative position of the communication device 10 with respect to the event causing source of an event having simultaneously occurred in the communication system 2. For example, when the event is an earthquake, the relative position information is the relative position of the communication device 10 with respect to the hypocenter of the earthquake or is information with which the relative position can be specified. Specifically, for example, when the event is an earthquake, the relative position information is information indicating the latitude and longitude of the hypocenter of the earthquake, the depth of the hypocenter of the earthquake, the speed of the earthquake, the distance to the hypocenter, or the like.

The relative position information may be calculated and updated as appropriate by the classification unit 28C to be described later or the like at an event occurrence (will be described later in details).

An event refers to a phenomenon having simultaneously occurred in the network of the communication system 2. Simultaneous generation means occurrences at the same time. Specifically, in the present embodiment, the event is a phenomenon having simultaneously occurred in the multi-hop network as the network of the communication system 2. The event is a phenomenon such as an earthquake, illumination lighting on or off, or instrument turning on or off. The present embodiment will be described with an assumption that the event is an earthquake. The event only needs to be a phenomenon that simultaneously occurs in the network of the communication system 2 and is not limited to an earthquake.

The communication data ID is identification information of the corresponding communication data.

As described above, communication data includes at least sensor data and time information, the sensor data being a result of measurement by a sensor mounted on a communication device 10 identified by the corresponding node ID, and the time information being the measurement time of the sensor data.

The sensor data is information indicating a result of environmental property measurement by the sensor. The sensor data is, for example, acceleration information obtained by measuring earthquake motion, luminance information of an illumination, or current consumption information at activation and termination of the communication device 10, but not limited thereto. The sensor data may be continuous waveform data obtained through sampling for a certain duration or may be information selectively obtained by extracting one or more characteristic amounts. A characteristic amount may be, for example, at least one of the maximum and minimum values of the sensor data.

The time information included in communication data is information indicating the measurement time of the sensor data. Specifically, the time information as the measurement time of the sensor data is, for example, time information of a sampling timing at which the sensor data or a characteristic amount of the sensor data is sampled.

As described above, the present embodiment will be described with an assumption that an event is an earthquake. The present embodiment will be described also with an example in which sensor data is expressed as a sensor waveform such as acceleration waveform data obtained by measurement for a certain duration by a sensor and time information is time information of each of sampling timings on the sensor waveform.

Communication data may further include other information such as information indicating the hop count of a communication device 10 from the collection device 20, the communication device 10 being identified by the corresponding node ID. In other words, communication data may include the hop count of a communication device 10 at the transmission source of the communication data.

Description continues with reference to FIG. 3 again. Upon each reception of communication data from each of the communication devices 10, the transmission-reception unit 28A registers the received communication data to the communication data DB 26A. Accordingly, the communication data received from each of the communication devices 10 is sequentially registered to the communication data DB 26A. In the present embodiment, communication data is collected from each of the communication devices 10 to the collection device 20 through one or more other communication devices 10 by multi-hop communication in some cases. Thus, the transmission-reception unit 28A may read the communication data of each of one or more communication devices 10 from a packet received from a communication device 10 having a hop count of "1" and may register the communication data of each of the communication devices 10 to the communication data DB 26A. As described above, the communication data registration to the communication data DB 26A may be performed after time information correction by the correction unit 28F to be described later.

The specification unit 28B specifies, as event communication data, communication data including event sensor data that is the sensor data of an event having simultaneously occurred in the network of the communication system 2. Event communication data is communication data including event sensor data that is the sensor data of an event having simultaneously occurred in the network of the communication system 2.

The specification unit 28B determines whether an event has occurred. The specification unit 28B determines that an event has occurred, for example, when an event is sensed by a sensor configured to sense an event occurrence and provided to the collection device 20. Alternatively, the specification unit 28B may determine that an event has occurred when having received a notification of an event occurrence from an external information processing device outside the collection device 20. For example, the specification unit 28B may determine that an event has occurred when having received a notification of an event occurrence from an issuing server device that issues an earthquake early warning at a meteorological agency or the like through the network NW or the like.

On determining that an event has occurred, the specification unit 28B specifies, as event communication data, communication data including event sensor data that is the sensor data of a measurement result of the event.

For example, the specification unit 28B specifies, as event communication data, communication data received earliest after determination of an event occurrence among communication data sequentially received from each communication device 10 in each predetermined time. Specifically, the specification unit 28B specifies, as event communication data of each of the communication devices 10, communication data received first from the communication device 10 after determination of an event occurrence.

The specification unit 28B may specify, as event communication data of each of the communication devices 10, communication data received earliest among communication data received from each of the communication devices 10 in a predetermined time after determination of an event occurrence.

With the processing above, for each of at least some the communication devices 10 included in the communication system 2, the specification unit 28B specifies, as event communication data, communication data received at a particular timing among received communication data. As described above, communication data includes sensor data and time information. In the present embodiment, sensor data included in communication data specified as event communication data is referred to as event sensor data.

The classification unit 28C classifies the communication devices 10 included in the communication system 2 into one or more groups, on the basis of a predetermined classification criteria.

The classification criteria is a criteria for classifying the communication devices 10 included in the communication system 2 into groups of communication devices 10 having similar items that could affect the difference in the time information of sensor data between communication devices 10. The classification criteria indicates, for example, similarity in at least one of the installation environment information of communication devices 10 and sensor-related information related to event sensor data included in the event communication data thereof.

Similarity in the installation environment information of communication devices 10 means similarity in at least one of the installation place information of the communication devices 10, the absolute position information of the communication devices 10, the network environment information of the communication devices 10, and the relative position information of the communication devices 10 with respect to an event causing source.

Figure 5A:
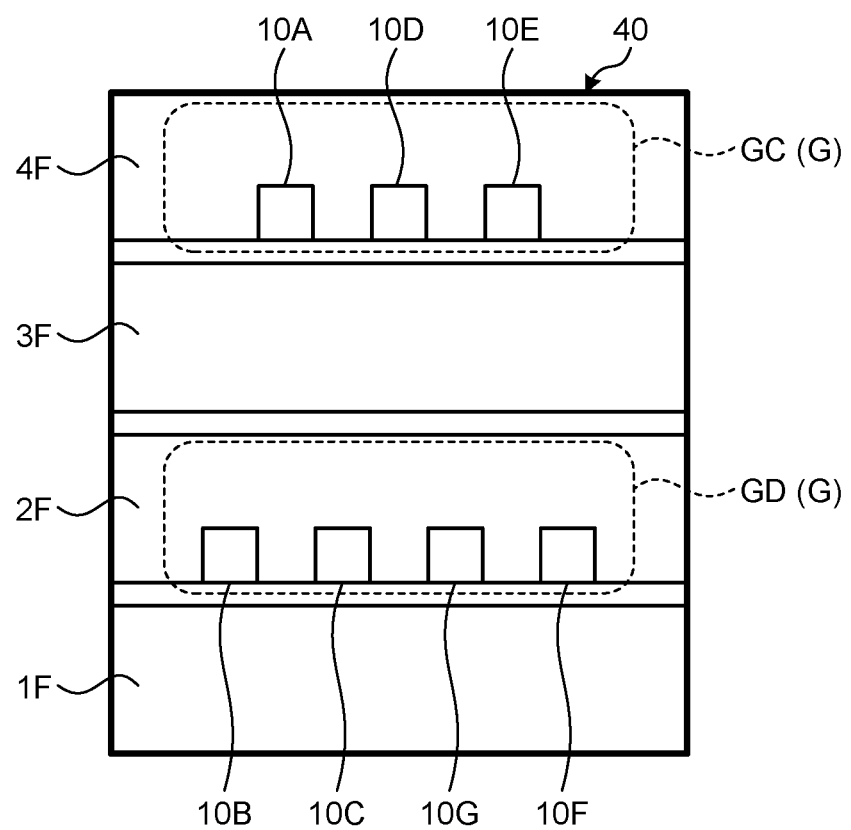
FIG. 5A is an explanatory diagram of classification into groups.

FIG. 5A is an explanatory diagram of exemplary classification into groups G. It is assumed that the classification criteria indicates classification into groups in which the installation place information of communication devices 10 is similar. It is also assumed that the installation place information is information indicating the installation floor of a communication device 10 in a building 40. In addition, it is assumed that, for example, the communication devices 10A, 10D, and 10E are installed on the fourth floor of the building 40 and the communication devices 10B, 10C, 10G, and 10F are installed on the second floor of the building 40. In this case, the classification unit 28C classifies the communication devices 10A, 10D, and 10E installed on the fourth floor of the building 40 into one group GC. The classification unit 28C classifies the communication devices 10B, 10C, 10G, and 10F disposed on the second floor of the building 40 into one group GD. The groups GC and GD are exemplary groups G.

Figure 5B:
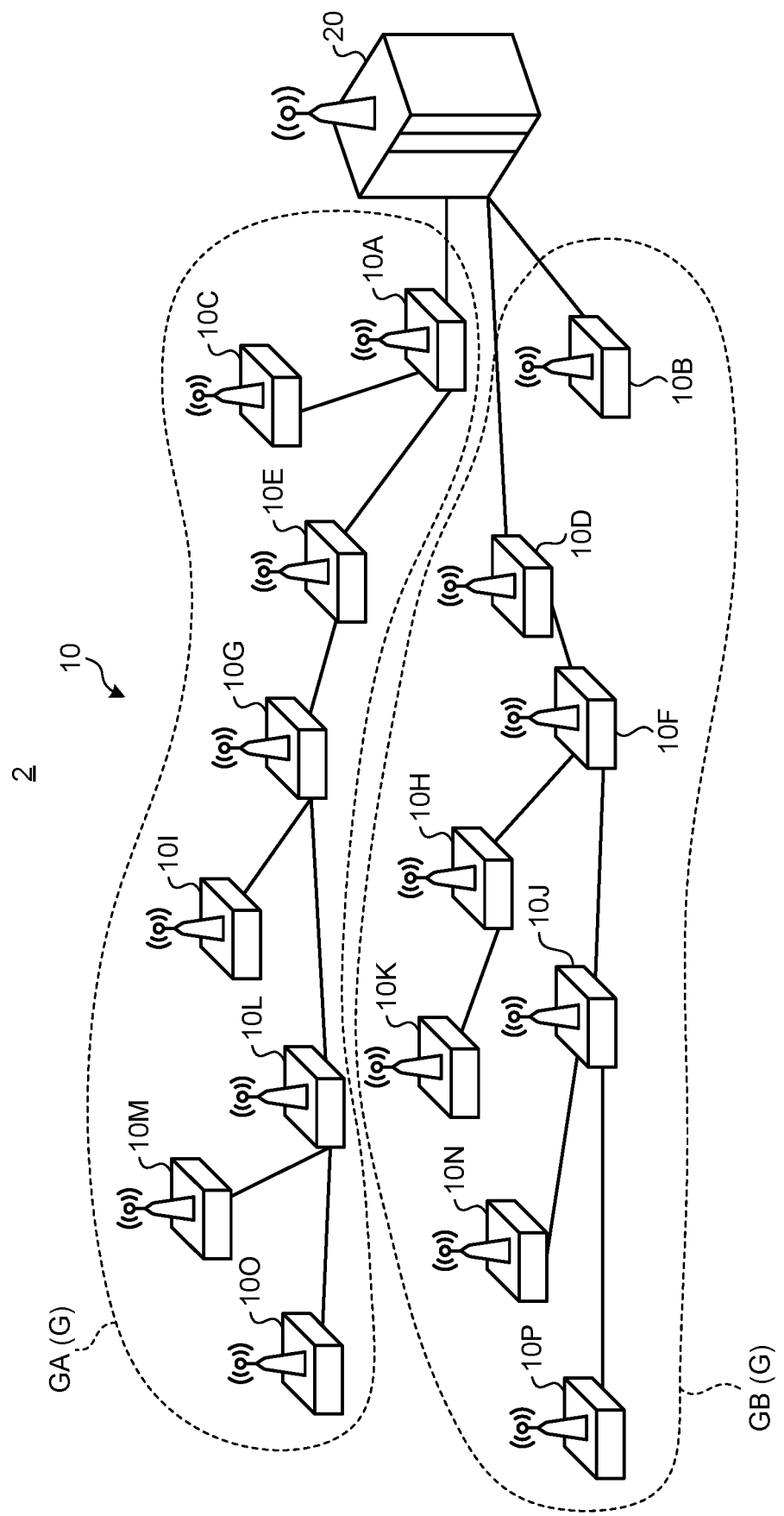
FIG. 5B is an explanatory diagram of classification into groups.

FIG. 5B is an explanatory diagram of exemplary classification into groups G. It is assumed that the classification criteria indicates classification into groups in which the network environment information of communication devices 10 is similar. In this case, for example, the classification unit 28C classifies, into one group GA, the communication device 10A and other communication devices 10, namely, the communication devices 10C, 10E, 10G, 10I, 10L, 10M, and 10O, which directly or indirectly have the communication device 10A as a parent node among the communication devices 10 included in the communication system 2. For example, the classification unit 28C classifies, into one group GB, the communication device 10B and other communication devices 10, namely, the communication devices 10D, 10F, 10J, 10H, 10K, 10N, and 10P, directly or indirectly which have the communication device 10B as a parent node among the communication devices 10 included in the communication system 2. The groups GA and GB are exemplary groups G.

FIG. 5C is an explanatory diagram of exemplary classification into groups G. It is assumed that the classification criteria indicates classification into groups in which the relative position information of communication devices 10 with respect to an event causing source is similar. In addition, it is assumed that an event determined to have occurred by the specification unit 28B is an earthquake. In this case, the classification unit 28C calculates a hypocenter distance of each of the communication devices 10 from the hypocenter of the earthquake, on the basis of the latitude and longitude of the hypocenter, the depth of the hypocenter, and the absolute position information of each of the communication devices 10. The classification unit 28C may acquire information such as the latitude and longitude of the hypocenter of the earthquake and the depth of the hypocenter from an information processing device such as a portable terminal or an information distribution device outside the collection device 20. Then, the classification unit 28C classifies the communication devices 10 into groups in which the difference in the calculated hypocenter distance among communication devices 10 is equal to or smaller than a threshold value, thereby classifying the communication devices 10 into groups G.

The classification unit 28C may calculate the time of earthquake arrival at each of the communication devices 10 by multiplying the hypocenter distance calculated for each of the communication devices 10 by a seismic wave speed. For example, the classification unit 28C may acquire the seismic wave speed by reading seismic-wave-speed information stored in the storage unit 26 in advance or may acquire, from the UI unit 24, seismic-wave-speed information input by an operation instruction on the UI unit 24 by the administrator or the like.

The classification unit 28C may classify the communication devices 10 into groups G of communication devices 10 among which the difference in the time of earthquake arrival is equal to or smaller than a predetermined time difference, thereby classifying the communication devices 10 into groups G.

It is assumed here that the classification criteria indicates classification into groups in which sensor-related information related to event sensor data included in event communication data is similar. The sensor-related information is information including at least one of a cross correlation function of the event sensor data and analysis result information of the event sensor data.

In this case, the classification unit 28C may classify the communication devices 10 into groups in which the difference in the cross correlation function of the sensor waveform of event sensor data included in the event communication data of each of the communication devices 10 or in the time of the highest value of the cross correlation function is equal to or smaller than a predetermined range, thereby classifying the communication devices 10 into groups G. Alternatively, the classification unit 28C may classify the communication devices 10 into groups in which analysis result information obtained by analyzing event sensor data by machine learning is similar, thereby classifying the communication devices 10 into groups G. The machine learning may employ a well-known machine learning algorithm.

The classification unit 28C only needs to classify the communication devices 10 included in the communication system 2 into one or more groups G and may classify all communication devices 10 included in the communication system 2 into one group G depending on the classification criteria or the like. In other words, the classification unit 28C may have a form not to classify the communication devices 10 included in the communication system 2 into groups G.

Description continues with reference to FIG. 3 again.

The setting unit 28D sets a reference communication device serving as a reference among the communication devices 10.

The setting unit 28D sets, for each group G of classification by the classification unit 28C, one reference communication device serving as a reference among the communication devices 10 belonging to the group G.

For example, the setting unit 28D sets, as a reference communication device, a communication device 10 having the smallest error in synchronization with the collection device 20 among the communication devices 10 belonging to the group G. For example, the setting unit 28D sets, as a reference communication device, a communication device 10 having a smallest hop count among the communication devices 10 belonging to the group G. Alternatively, for example, the setting unit 28D may set, as reference communication device, a communication device 10 having the smallest number of times of communication failure. Alternatively, the setting unit 28D may set, as a reference communication device, a communication device 10 having a small hop count and the smallest number of times of communication failure.

Alternatively, in accordance with the kind of an event that has occurred, the setting unit 28D may set, as a reference communication device, the communication device 10 installed in the installation environment having the smallest environmental property variation for the event among the communication devices 10 belonging to the group G.

Alternatively, a sensor may be mounted on the collection device 20 and the setting unit 28D may set the collection device 20 as a reference communication device. Alternatively, the setting unit 28D may set, as one reference communication device for the entire communication system 2, one of reference communication devices set for the respective groups G.

The calculation unit 28E calculates a time delay amount among communication devices 10 on the basis of event sensor data and time information included in the event communication data of each of the communication devices 10.

Specifically, the calculation unit 28E calculates the delay amount among communication devices 10 belonging to each of one or more groups G of classification by the classification unit 28C.

For example, the calculation unit 28E calculates, as the delay amount, the time difference between reference time information and time information included in event communication data received from each of the communication devices 10, the reference time information being time information included in event communication data received from a reference communication device set by the setting unit 28D.

Specifically, for each group G of classification by the classification unit 28C, the calculation unit 28E calculates, as the time delay amount of each of the communication devices 10 belonging to the group G, the time difference between reference time information and time information included in the event communication data of the communication device 10, the reference time information being time information included in the event communication data of a reference communication device set for the group G.

For example, the calculation unit 28E calculates the delay amount by using a sensor waveform such as acceleration waveform data indicating the relation between a time and sensor intensity expressed by event sensor data and time information. Specifically, the calculation unit 28E calculates, as the delay amount, the difference between the times of timings at which the sensor waveform of the reference communication device and the sensor waveform of the communication device 10 have identical waveform shapes. For example, the calculation unit 28E calculates the delay amount by using the cross correlation function.

Figure 6:
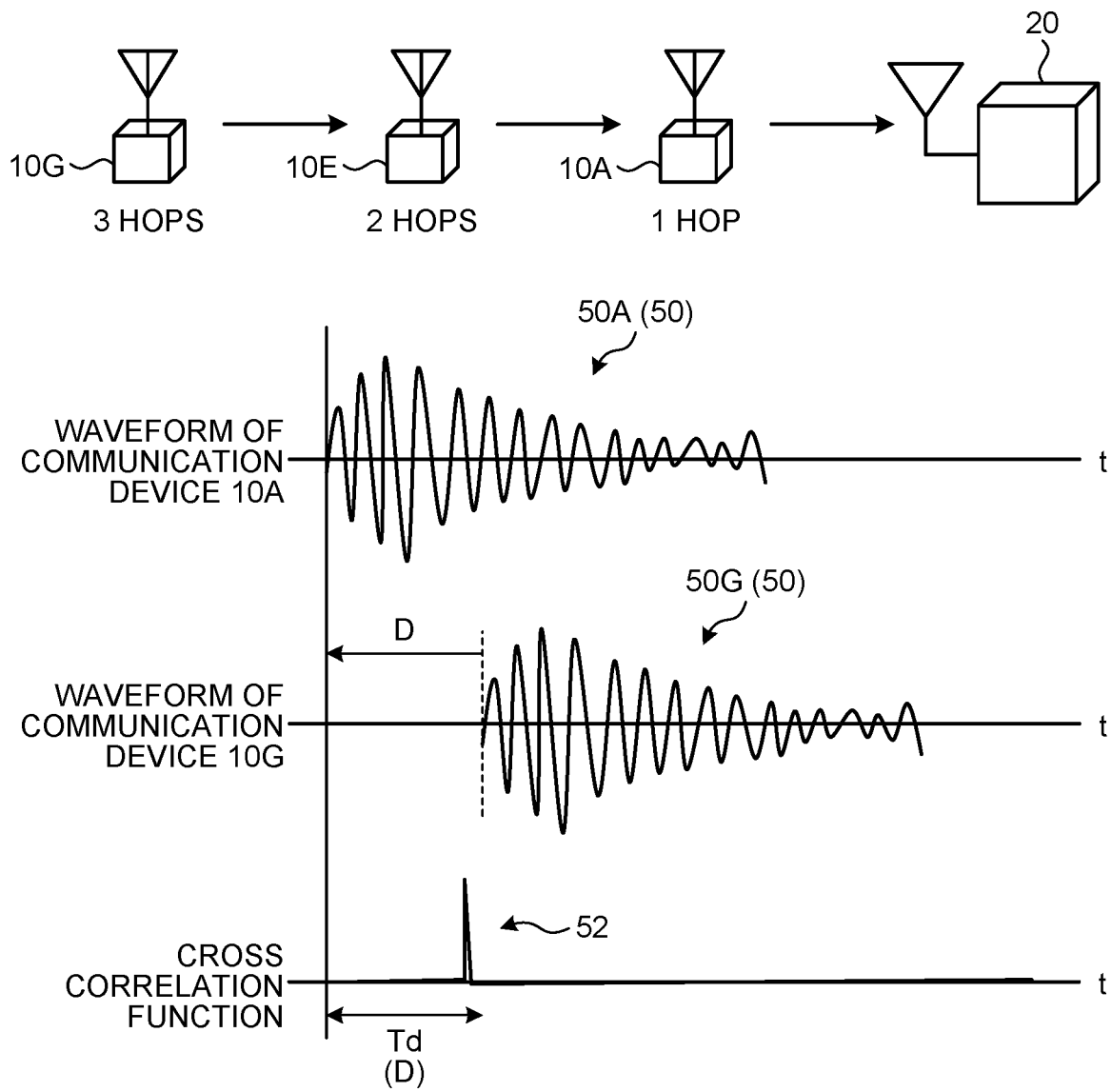
FIG. 6 is an explanatory diagram of delay amount calculation.

FIG. 6 is an explanatory diagram of exemplary calculation of a delay amount D. For example, it is assumed that the communication device 10A is set as a reference communication device and that the delay amount D of the communication device 10B is calculated. For example, it is assumed that a reference sensor waveform 50A is a sensor waveform 50 indicating the relation between a time and sensor intensity expressed by event sensor data and reference time information included in event communication data received from the communication device 10A as the reference communication device. It is also assumed that a sensor waveform 50G is a sensor waveform 50 indicating the relation between a time and sensor intensity expressed by event sensor data and time information included in event communication data received from the communication device 10G.

In this case, the calculation unit 28E calculates a cross correlation function 52 of the reference sensor waveform 50A and the sensor waveform 50G. Then, the calculation unit 28E calculates a time difference Td as the time delay amount D of the communication device 10G relative to the communication device 10A as the reference communication device, the time difference Td being the duration from a time at which the cross correlation function 52 has the highest value to the starting point of the reference sensor waveform 50A.

The calculation unit 28E may calculate the time difference between the time of a peak of the reference sensor waveform 50A and the time of a peak of the sensor waveform 50G as the time delay amount D of the communication device 10G relative to the communication device 10A as the reference communication device.

Similarly, for each group G of classification by the classification unit 28C, the calculation unit 28E calculates, as the time delay amount D of each of the communication devices 10 belonging to the group G, the time difference Td between reference time information and time information included in the event communication data of each of the communication devices 10, the reference time information being time information included in the event communication data of a reference communication device set for the group G.

The calculation unit 28E can calculate the time delay amount D of each of the communication devices 10 for each group G in which at least one of the installation environment information and the sensor-related information is similar by calculating the time delay amount D of each of any other communication devices 10 belonging to the group G relative to a reference communication device set for the group G. Thus, the calculation unit 28E can highly accurately calculate delay amounts D with less error by calculating the time delay amount D of each of the communication devices 10 for each group G.

Note that, as described above, the setting unit 28D may set, as one reference communication device for the entire communication system 2, one of reference communication devices set for respective groups G. As described above, when the communication devices 10 included in the communication system 2 are not classified into groups G, one reference communication device is set for the entire communication system 2.

In this case, the calculation unit 28E may calculate, in the above-described manner, the time delay amount D of each of any other communication devices 10 relative to the one reference communication device set for the entire communication system 2.

The calculation unit 28E can calculate, for each of the communication devices 10 included in the communication system 2, a delay amount D for synchronizing time in the entire communication system 2 by calculating the time delay amount D of each of the communication devices 10 relative to the one reference communication device set for the entire communication system 2.

The calculation unit 28E may calculate the time delay amount D of each communication device 10 relative to the collection device 20 by using the hop count of the communication device 10.

Figure 7:
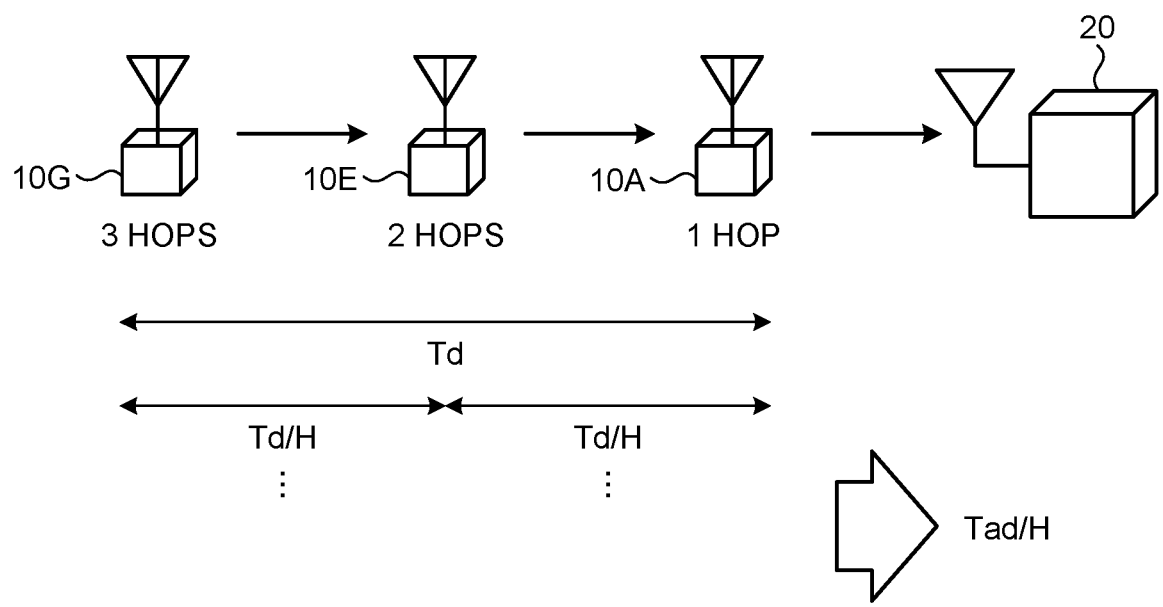
FIG. 7 is an explanatory diagram of delay amount calculation.

FIG. 7 is an explanatory diagram of exemplary calculation of the delay amount D. For example, it is assumed that the time delay amount D of every communication device 10 included in the communication system 2 relative to the collection device 20 is calculated. FIG. 7 exemplarily illustrates the communication device 10G having a hop count of "3", the communication device 10E having a hop count of "2", and the communication device 10A having a hop count of "1".

In this case, the calculation unit 28E calculates the time difference Td in time information included in event communication data for each pair of the communication devices 10 included in the communication system 2. Then, the setting unit 28D calculates a time difference per hop Td/H by dividing the time difference Td calculated for each pair of the communication devices 10 by the difference in the hop count between the communication devices 10. As described above, the time difference Td may be calculated by using the duration from a time at which the cross correlation function is highest to the time of the starting point of one of the sensor waveforms, the difference between the peaks of the sensor waveforms 50, or the like.

For example, the following describes a case of the communication devices 10, specifically the communication devices 10A and 10G. In this case, the calculation unit 28E divides the time difference Td between time information included in the event communication data of the communication device 10A and time information included in the event communication data of the communication device 10B by "2" that is the difference in the hop count between the communication device 10A and the communication device 10G. Through this calculation, the calculation unit 28E calculates the time difference per hop Td/H between the communication devices 10, specifically the communication devices 10A and 10G.

Then, the calculation unit 28E similarly generates plural pairs of communication devices 10 in combinations different from one another among the communication devices 10 included in the communication system 2. Then, the calculation unit 28E calculates the time difference per hop Td/H for each generated pair in the above-described manner.

Then, the calculation unit 28E calculates, as an average time difference Tad/H per hop of the entire communication system 2, the average value of the time difference per hop Td/H calculated for each generated pair.

Then, for each of the communication devices 10 included in the communication system 2, the calculation unit 28E calculates, as the time delay amount D of the communication device 10, a multiplication result obtained by multiplying the hop count of the communication device 10 by the above-described average time difference Tad/H per hop.

In this manner, the calculation unit 28E may calculate the time delay amount D of each of the communication devices 10 relative to the collection device 20. In this case, the time delay amount D of each of the communication devices 10 included in the communication system 2 relative to the collection device 20 can be calculated even when event communication data cannot be specified for some communication devices 10 by the specification unit 28B.

The calculation unit 28E may calculate, for each group G of classification by the classification unit 28C, the time delay amount D of each of the communication devices 10 belonging to the group G relative to the collection device 20 in the above-described manner by using the hop count of each of the communication devices 10.

Description continues with reference to FIG. 3 again. The calculation unit 28E registers the delay amount D calculated for each of the communication devices 10 to the delay amount DB 26B.

Figure 8:
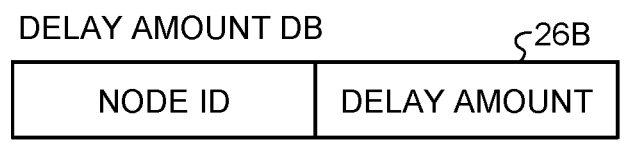
FIG. 8 is a schematic diagram of a data configuration of a delay amount DB.

FIG. 8 is a schematic diagram illustrating an exemplary data configuration of the delay amount DB 26B. The delay amount DB 26B is, for example, a database in which the node ID and the delay amount D are associated. The data format of the delay amount DB 26B is not limited to a database.

Each time a new event occurs and a new delay amount D is calculated for each of the communication devices 10, the calculation unit 28E registers the calculated delay amount D to the delay amount DB 26B in association with the node ID of the communication device 10 corresponding to the delay amount D.

The calculation unit 28E may sequentially store, for each of the communication devices 10, a delay amount D sequentially calculated each time an event occurs, in association with the node ID. Each time a new delay amount D is calculated, the calculation unit 28E may register, for each of the communication devices 10, an average value with any delay amount D calculated in the past to the delay amount DB 26B as the latest delay amount D.

Alternatively, the calculation unit 28E may register, for each of the communication devices 10, an average value after a delay amount D sequentially calculated each time an event occurs is weighted in accordance with the contents of the event to the delay amount DB 26B as the latest delay amount D. In this case, for example, the calculation unit 28E may set a larger weighting value for an upper seismic intensity in a case of an earthquake or may set a larger weighting value for a delay amount obtained when the hop count of a communication device 10 is smaller.

Description continues with reference to FIG. 3 again.

The correction unit 28F corrects the time information of sensor data on the basis of the delay amount D.

The correction unit 28F corrects time information included in communication data received from each of the communication devices 10 to a time that compensates a delay amount D calculated for each of the communication devices 10.

Description will be made with reference to FIG. 6. For example, it is assumed that the communication device 10A is set as a reference communication device and that the time delay amount D of the communication device 10B relative to the communication device 10A is calculated. In this case, the correction unit 28F corrects time information in accordance with the delay amount D so that the time of the starting point of the sensor waveform 50G included in communication data received from the communication device 10G coincides with the time of the starting point of the reference sensor waveform 50A.

Specifically, the correction unit 28F corrects a time expressed by time information included in communication data received from each of the communication devices 10 to a time shifted by a time corresponding to the delay amount D to compensate the delay amount D of each of the communication devices 10.

Then, the correction unit 28F registers communication data including the corrected time information to the communication data DB 26A. Accordingly, the communication data including the corrected time information is registered in the communication data DB 26A. When communication data is registered in the communication data DB 26A by the transmission-reception unit 28A, the correction unit 28F may update, with the corrected time information, time information included in the corresponding communication data in the communication data DB 26A.

With the time information correction by the correction unit 28F, time information included in communication data received from each of the communication devices 10 is corrected by using a time measured by a clock function implemented on a communication device 10 set as a reference communication device or on the collection device 20.

Accordingly, the difference in time information among the communication devices 10 connected to the network of the communication system 2 is easily corrected.

The following describes an exemplary process of information processing executed at the collection device 20 of the present embodiment.

Figure 9:
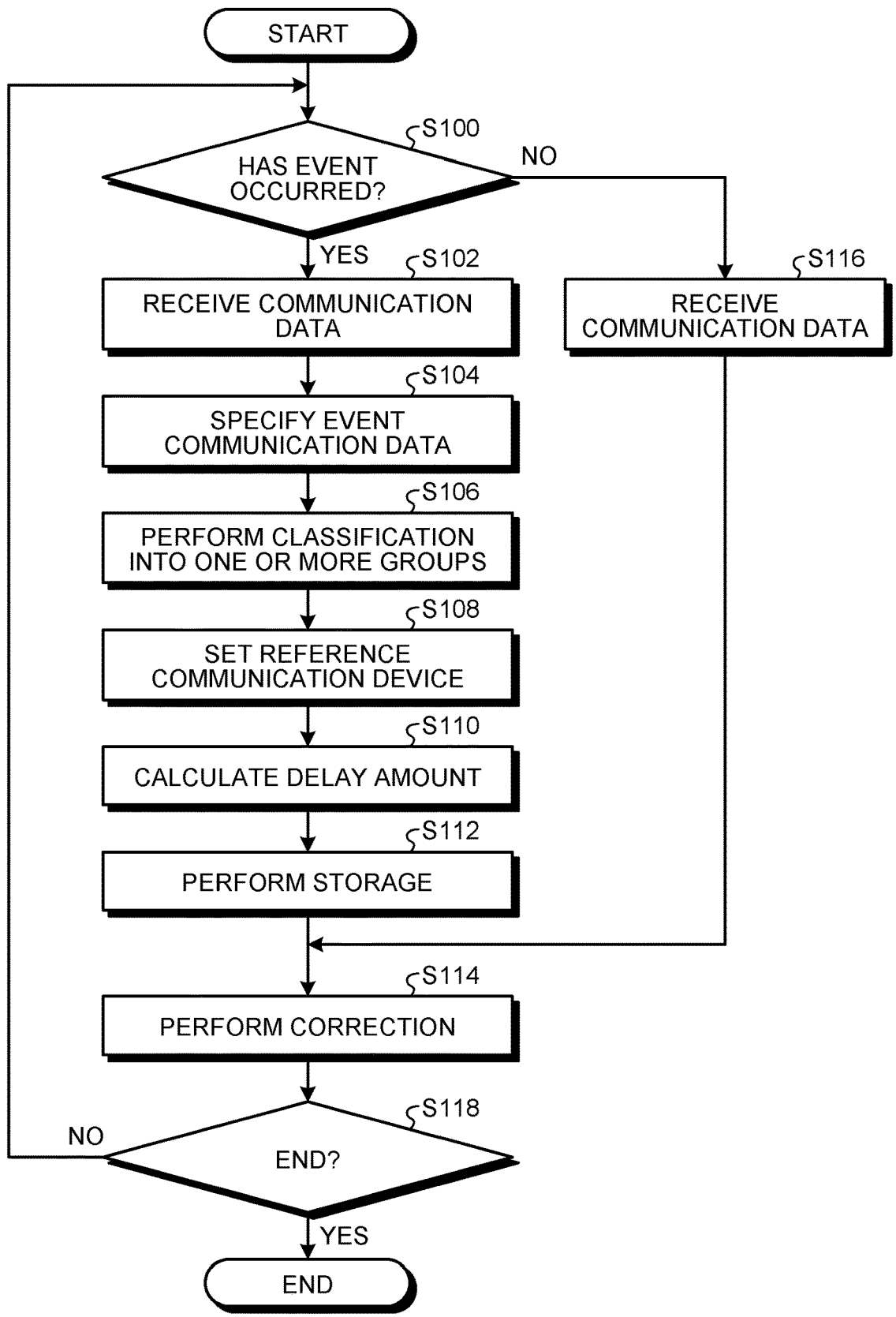
FIG. 9 is a flowchart of the process of information processing.

FIG. 9 is a flowchart illustrating the exemplary process of information processing executed at the collection device 20 of the present embodiment.

The specification unit 28B determines whether an event has simultaneously occurred in the network of the communication system 2 (step S100). In a case of positive determination at step S100 (Yes at step S100), the process proceeds to step S102.

At step S102, the transmission-reception unit 28A receives communication data from each of the communication devices 10 (step S102).

The specification unit 28B specifies, as event communication data, the communication data received at step S102 (step S104).

The classification unit 28C classifies the communication devices 10 included in the communication system 2 into one or more groups G on the basis of the predetermined classification criteria (step S106). As described above, the classification unit 28C classifies the communication devices 10 included in the communication system 2 into one or more groups G in which at least one of the installation place information of the communication devices 10, the absolute position information of the communication devices 10, the network environment information of the communication devices 10, and the relative position information of the communication devices 10 with respect to an event causing source is similar.

The setting unit 28D sets a reference communication device serving as a reference among the communication devices 10 and the collection device 20 (step S108). For example, the setting unit 28D sets one reference communication device for each group G of the classification at step S106.

The calculation unit 28E calculates the time delay amount D of each of the communication devices 10 relative to the reference communication device on the basis of event sensor data and time information included in the event communication data specified for each of the communication devices 10 at step S104 (step S110).

The calculation unit 28E stores the delay amount D calculated for each of the communication devices 10 at step S110 in the delay amount DB 26B in association with the node ID of each of the communication devices 10 (step S112).

The correction unit 28F corrects the time information of sensor data on the basis of the delay amount D (step S114). The correction unit 28F corrects the time information of the sensor data included in the communication data received from each of the communication devices 10 at step S102 by using the delay amount D corresponding to the node ID of each of the communication devices 10 in the delay amount DB 26B. Then, the process proceeds to step S118.

In a case of negative determination at step S100 (No at step S100), the process proceeds to step S116. At step S116, the transmission-reception unit 28A receives communication data from each of the communication devices 10 (step S116). Then, the process proceeds to step S114. At step S114, the correction unit 28F corrects the time information of sensor data included in the communication data received from each of the communication devices 10 at step S116 by using the delay amount D corresponding to the node ID of each of the communication devices 10 in the delay amount DB 26B. Then, the process proceeds to step S118.

At step S118, the control unit 28 determines whether to end the present information processing (step S118). In a case of negative determination at step S118, the process returns to the above-described step S100. In a case of positive determination at step S118 (Yes at step S118), the present routine ends.

As described above, the collection device 20 of the present embodiment includes the transmission-reception unit 28A, the specification unit 28B, the calculation unit 28E, and the correction unit 28F. The transmission-reception unit 28A receives, from each of the communication devices 10 connected to a network, communication data including sensor data and time information, the sensor data being a result of measurement by a sensor mounted on each of the communication devices 10, and the time information being the measurement time of the sensor data. The specification unit 28B specifies, as event communication data, the communication data including event sensor data that is sensor data of an event having simultaneously occurred in the network. The calculation unit 28E calculates the time delay amount D among the communication devices 10 on the basis of the event sensor data and the time information that are included in the event communication data of each of the communication devices 10. The correction unit 28F corrects the time information of the sensor data included in the communication data on the basis of the delay amount D.

In a conventional system configured to collect sensor data, difference occurs in time information of the sensor data in some cases due to individual difference among communication devices, transmission delay, communication frequency, synchronization error in accordance with the number of relays, and the like. Thus, in a known system of the conventional technologies, a GPS is mounted on each of communication devices. However, the configuration in which a GPS is mounted on each of communication devices potentially leads to device size increase, complication, power saving performance degradation, and the like. In another disclosed configuration of the conventional technologies, an error from the reception time of a sensing start signal received from a collection device is calculated, and time information corrected in accordance with the error is transmitted from communication devices to the collection device. However, in the conventional technologies, transmission delay between the collection device and the communication device is not considered, and the difference in time information is not solved in some cases. Thus, with the conventional technologies, it has been difficult to easily reduce the difference in time information between communication devices connected to a network.

By contrast, in the collection device 20 of the present embodiment, event communication data including event sensor data that is a measurement result of an event having simultaneously occurred in the network of the communication system 2 is specified, and the time delay amount D among the communication devices 10 is calculated on the basis of the event sensor data and time information included in the event communication data of each of the communication devices 10. Then, in the collection device 20 according to the present embodiment, the time information of sensor data included in communication data received from the communication device 10 is corrected by using the delay amount D calculated for each of the communication devices 10.

In this manner, the collection device 20 of the present embodiment corrects time information included in communication data received from each of the communication devices 10 included in the communication system 2 by using event communication data including event sensor data that is a measurement result of an event having simultaneously occurred in the network of the communication system 2.

Accordingly, the collection device 20 of the present embodiment can easily correct the difference in time information among the communication devices 10 with a simple configuration.

Therefore, the collection device 20 of the present embodiment can easily reduce the difference in time information among the communication devices 10 connected to the network.

Moreover, the collection device 20 of the present embodiment can easily correct the difference in the time information of sensor data by using event communication data even in an environment in which a time error among the communication devices 10 increases in accordance with individual difference among clocks of the communication devices 10, transmission delay, communication frequency, and the number of relays.

Figure 10:
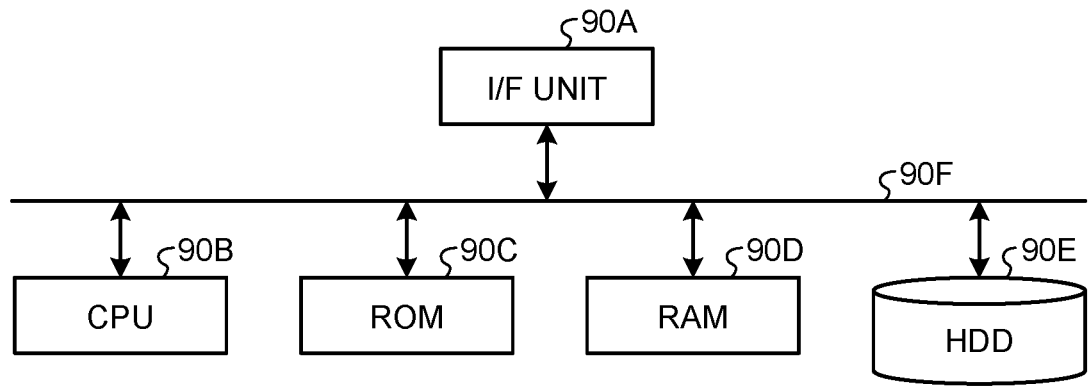
FIG. 10 is a hardware configuration diagram.

The following describes an exemplary hardware configuration of the communication devices 10 and the collection device 20 of the present embodiment. FIG. 10 is an exemplary hardware configuration diagram of the communication devices 10 and the collection device 20 of the present embodiment.

The communication devices 10 and the collection device 20 of the present embodiment have a hardware configuration of a normal computer, including a control device such as a CPU 86, storage devices such as a read only memory (ROM) 88, a random access memory (RAM) 90, and a hard disk drive (HDD) 92, an I/F unit 82 that is an interface for various instruments such as communication instruments, an output unit 80 configured to output various kinds of information, an input unit 94 configured to receive an operation by a user, and a bus 96 connecting the components.

In the communication devices 10 and the collection device 20 of the present embodiment, each above-described component is implemented on the computer as the CPU 86 reads a computer program from the ROM 88 onto the RAM 90 and executes the computer program.

A computer program for executing the above-described processing executed by the communication devices 10 and the collection device 20 of the present embodiment may be stored in the HDD 92. The computer program for executing the above-described processing executed by the communication devices 10 and the collection device 20 of the present embodiment may be incorporated in the ROM 88 in advance and provided.

The computer program for executing the above-described processing executed by the communication devices 10 and the collection device 20 of the present embodiment may be stored as a file in an installable or executable format in a computer-readable storage medium such as a CD-ROM, a CD-R, a memory card, a digital versatile disc (DVD), or a flexible disk (FD) and may be provided as a computer program product. The computer program for executing the above-described processing executed by the communication devices 10 and the collection device 20 of the present embodiment may be stored on a computer connected to a network such as the Internet and may be provided by downloading through the network. The computer program for executing the above-described processing executed by the communication devices 10 and the collection device 20 of the present embodiment may be providing or distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   one or more hardware processors configured to:
      receive, from each of communication devices connected to a network, communication data including sensor data and time information, the sensor data indicating a result of measurement by a sensor mounted on each of the communication devices, the time information indicating a measurement time of the sensor data;
      specify, as event communication data, the communication data including event sensor data being the sensor data of an event simultaneously occurring in the network;
      calculate a time delay amount among the communication devices on the basis of the event sensor data and the time information, each being included in the event communication data of each communication device; and
      correct the time information of the sensor data included in the communication data on the basis of the delay amount,
   wherein the one or more hardware processors are further configured to:
      set a reference communication device serving as a reference among the communication devices and the information processing device,
      calculate, as the delay amount, a time difference between reference time information and the time information, the reference time information being the time information included in the event communication data received from the reference communication device, the time information being included in the event communication data received from each of the communication devices, and
      calculate, as the delay amount, a duration from a time at which a cross correlation function of a reference sensor waveform and a sensor waveform has the highest value to a time of a starting point of the reference sensor waveform, the reference sensor waveform indicating a relation between a time and sensor intensity expressed by the event sensor data and the reference time information that are included in the event communication data received from the reference communication device, the sensor waveform indicating a relation between a time and sensor intensity expressed by the event sensor data and the time information that are included in the event communication data received from the communication device.

2. The information processing device according to claim 1, wherein the one or more hardware processors are further configured to calculate, as the delay amount, a time difference between a time of a peak of a reference sensor waveform and a time of a peak of a sensor waveform, the reference sensor waveform indicating a relation between a time and sensor intensity expressed by the event sensor data and the reference time information that are included in the event communication data received from the reference communication device, the sensor waveform indicating a relation between a time and sensor intensity expressed by the event sensor data and the time information that are included in the event communication data received from the communication device.

3. The information processing device according to claim 1, wherein
   the network is a multi-hop network,
   the communication data includes a hop count of the communication device at a transmission source of the communication data, and
   the one or more hardware processors are further configured to
      calculate, for each pair of the communication devices, a time difference per hop by dividing a time difference in the time information included in the event communication data by a difference in the hop count between the corresponding pair of communication devices,
      calculate, an average time difference per hop in the multi-hop network on the basis of the time difference per hop calculated for each pair of the communication devices, and
      calculate, as the delay amount for each of the communication devices, a multiplication result obtained by multiplying the hop count of the communication device by the average time difference.

4. An information processing device comprising:
   one or more hardware processors configured to:
      receive, from each of communication devices connected to a network, communication data including sensor data and time information, the sensor data indicating a result of measurement by a sensor mounted on each of the communication devices, the time information indicating a measurement time of the sensor data;

specify, as event communication data, the communication data including event sensor data being the sensor data of an event simultaneously occurring in the network;

calculate a time delay amount among the communication devices on the basis of the event sensor data and the time information, each being included in the event communication data of each communication device; and correct the time information of the sensor data included in the communication data on the basis of the delay amount, wherein the one or more hardware processors are further configured to classify the communication devices into one or more groups on the basis of a predetermined classification criteria, the one or more hardware processors are further configured to calculate, for each of the one or more groups, the delay amount between the communication devices belonging to the corresponding group, and the classification criteria indicates that at least one of installation environment information of the communication devices and sensor-related information related to the event sensor data included in the event communication data is similar.

5. The information processing device according to claim 4, wherein the installation environment information includes at least one of installation place information of the communication devices, absolute position information of the communication devices, network environment information of the communication devices, and relative position information of the communication devices with respect to an event causing source.

6. The information processing device according to claim 4, wherein the sensor-related information includes at least one of cross correlation function of the event sensor data and analysis result information of the event sensor data.

* * * * *

UNITED STATES PATENT AND TRADEMARK OFFICE
CERTIFICATE OF CORRECTION

| | | |
|---|---|---|
| PATENT NO. | : 12,267,753 B2 | Page 1 of 1 |
| APPLICATION NO. | : 17/823165 | |
| DATED | : April 1, 2025 | |
| INVENTOR(S) | : Sakie Nagakubo et al. | |

It is certified that error appears in the above-identified patent and that said Letters Patent is hereby corrected as shown below:

On the Title Page

After:
"(65) Prior Publication Data
US 2023/0239666 A1 Jul. 27, 2023",

Please insert:
--(30) Foreign Application Priority Data
Jan. 21, 2022 (JP) 2022-007611--.

Signed and Sealed this
Tenth Day of June, 2025

Coke Morgan Stewart
*Acting Director of the United States Patent and Trademark Office*